May 7, 1963  P. G. TURNER  3,088,192
METHOD OF JOINING TURBINE BLADE PARTS
Filed April 23, 1958  4 Sheets-Sheet 1

PHILIP G. TURNER
INVENTOR

BY *(signature)*

ATTORNEY

May 7, 1963 P. G. TURNER 3,088,192
METHOD OF JOINING TURBINE BLADE PARTS
Filed April 23, 1958 4 Sheets-Sheet 2

INVENTOR.
PHILIP G. TURNER
BY
ATTORNEY

May 7, 1963 P. G. TURNER 3,088,192
METHOD OF JOINING TURBINE BLADE PARTS
Filed April 23, 1958 4 Sheets-Sheet 4

INVENTOR.
PHILIP G. TURNER
BY
ATTORNEY

United States Patent Office 3,088,192
Patented May 7, 1963

3,088,192
METHOD OF JOINING TURBINE BLADE PARTS
Philip George Turner, Inkberrow, England, assignor to The International Nickel Company, Inc., New York, N.Y., a corporation of Delaware
Filed Apr. 23, 1958, Ser. No. 730,283
Claims priority, application Great Britain Apr. 26, 1957
4 Claims. (Cl. 29—156.8)

The present invention relates to the art of joining metals and, more particularly, to a method of joining together a plurality of mechanical components made of chromium-containing alloys so firmly that they may be subjected to considerable stress without parting company.

It is often necessary to join two or more mechanical components made of chromium-containing alloy so that the joint will be resistant to considerable stress but it is impossible to make a suitable joint by ordinary welding since the weld composition, inclusions and cast structure are unsuitable for joints in highly stressed wrought metal components. These conditions, i.e., conditions presenting extreme joining difficulties, arise particularly when the components are made of chromium-containing alloys because of the ease with which these alloys form oxide films which are of a refractory nature and are detrimental to good cohesion. The problem is particularly acute in the manufacture of articles which in operation are subjected to high centrifugal and centripetal forces, such as the rotors or discs of gas turbines and composite blades for gas turbines.

It is known that a chromium-containing alloy can be united to a non-chromium-containing metal, foundation by applying a protective film of nickel to the chromium-containing alloy, pressing the film and the foundation metal together and heating the assembly in a non-oxidizing atmosphere to cause the components of the assembly to bond together, i.e., the nickel is bonded to both the foundation metal and the chromium-containing alloy and remains as a layer separating the two. In such case, the joint produced has the strength of that of the nickel layer only. Thus, such procedure has been unsuccessful in producing a union between the metal components with a strength comparable to the parent components and wherein the joint has a composition substantially equivalent to the parent alloy.

Although many attempts were made to overcome the foregoing difficulties and other difficulties, none, as far as I am aware, was entirely successful when carried into practice commercially on an industrial scale.

It has now been discovered that, if one chromium-containing component is made to fit extremely closely into a slot or socket in another of the same or substantially the same composition with a thin nickel layer interposed between the components and the components are heated while applying light pressure, they can be caused to weld together by diffusion to provide a homogeneous union with a strength comparable to that of the parent components and wherein the joint has a composition substantially equivalent to the parent alloy.

It is an object of the present invention to provide an improved method for joining two or more chromium-containing alloy components which allows them to be subjected to considerable stress without separating.

The invention also contemplates providing an improved method of bonding one chromium-containing alloy component to another in which the bonding material used does not remain a separate layer between the components.

It is a further object of the invention to provide an improved method for welding together two chromium-containing alloy components which depends on the application of pressure at an elevated temperature with an interposed nickel layer.

The invention further contemplates providing a novel combination of operations to produce hollow metal bodies, including hollow turbine blades, hollow turbine assemblies, etc., from a plurality of heat-resisting alloy components which are bonded together by interposing metallic nickel therebetween and applying pressure at elevated temperatures.

It is another object of the invention to provide an improved method for making a turbine blade with cooling passages from a composite billet formed by diffusion bonding chromium-containing alloy components using interposed nickel metal.

Still another object of the invention is to provide a novel means for joining turbine blades to turbine blade roots and/or shrouds or for joining turbine blades to turbine rotor rims and the like.

Other objects and advantages will become apparent from the following description taken in conjunction with the accompanying drawing in which:

FIGURE 1 is a reproduction of a photomicrograph taken at 500 diameters of the microstructure of the interlayer and surrounding metal formed by joining two components of a chromium-containing heat resistant alloy according to the invention;

FIGURES 2(a) and 2(b) are reproductions of photomicrographs taken at 500 diameters of the microstructure of the interlayer and surrounding metal formed, not in accordance with the present invention, by joining two components of a chromium-containing heat resistant alloy wherein diffusion was incomplete;

Figure 1:

Generally speaking, the present invention contemplates making one component of a chromium-containing alloy fit extremely closely into a slot or socket in another component of the same or substantially the same composition, interposing a nickel layer between the mating surfaces, applying light pressure and heating the components at a temperature between about 1000° C. and about 1100° C. under non-oxidizing conditions for such a period that as a result of diffusion, the joint has a composition substantially equivalent to the parent alloy. This usually involves heating for from about 8 to about 15 hours.

It should be understood that the term "chromium-containing alloy" is used to include austenitic nickel-chromium alloys, including nickel-chromium-iron alloys, nickel-chromium-cobalt alloys and austenitic nickel-chromium stainless steels, and cobalt-chromium alloys, including cobalt-chromium-iron alloys, which contain a total of at least about 25% nickel plus chromium, cobalt plus chromium or nickel plus chromium plus cobalt (i.e., a total of at least about 25% of chromium plus nickel and/or cobalt), in addition to small amounts of aluminum, titanium, molybdenum, tungsten, niobium, tantalum, silicon, manganese, zirconium and boron which may optionally be present in the alloys. Other "chromium-containing alloys" to which the invention is applicable include manganese-chromium stainless steels and straight chromium stainless steels.

The invention has particular application to gas turbine parts made of nickel-chromium and nickel-chromium-cobalt base alloys such as the various alloys sold under the trademarks Nimonic, Inconel, Inconel "X," Inconel "700," etc. Turbine blade roots can be attached to rotor rims; shrouds can be attached to rings; turbine blades can be pressed or fitted into or onto end structures, i.e., blade roots and/or shrouds; and composite billets containing hollow passages can be formed for subsequent extruding or forging into blades with cooling passages, all according to the invention. By the use of the present invention, structures can be built up from a plurality of components so that the final structure has substantially the same strength as if it were made from an integral mass.

In carrying the invention into practice, it is advantageous to use as the interposed nickel layer between the mating surfaces one which is as thin as possible, advantageously the layer being no more than about 0.001 inch thick and certainly not more than about 0.005 inch thick. The interposed nickel can be nickel foil, nickel powder, or a sprayed nickel coating, or one or both of the pair of mating surfaces can be plated. If the mating surfaces are ground or lapped to a very close fit and where both surfaces are plated, the nickel plate is advantageously about 0.00025 inch thick but if only one of the mating surfaces is plated, the nickel layer is advantageously about 0.0005 inch thick. The more accurately the mating surfaces are machined, the thinner can be the nickel layer. With machined surfaces of a standard finish 25–50 micro inches (not ground or lapped) the foil or plated layer should be thicker, i.e., up to 0.005 inch thick. This thicker layer will compensate for any irregularities of the surface finish, but, of course, requires a longer diffusion time.

The pressure applied to the components prior to the diffusion should be at least about 10,000 pounds per square inch and need not exceed about 27,000 pounds (12 long tons) per square inch. Thus, the pressure may be in the range of about 10,000 pounds per square inch to about 20 tons per square inch and may be from about 10 to about 20 tons per square inch.

In every case, it is important that complete diffusion takes place, as otherwise the joint is not able to stand the high stresses required in service.

Figure 2A:
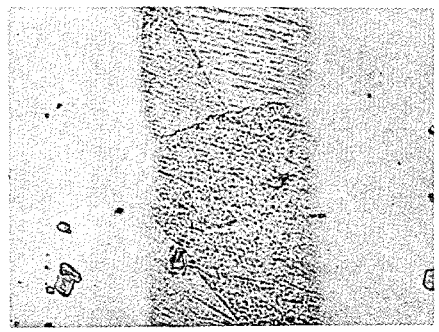
Figure 2B:
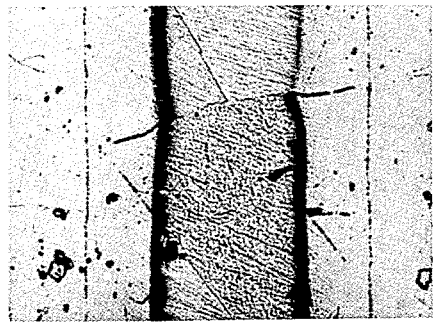

The structure of a joint between two components made of a nickel-chromium alloy containing titanium, aluminum, cobalt, etc., which has been subjected to complete diffusion welding according to the invention is shown by the photomicrograph in FIGURE 1 taken at 500 diameters. As can be seen, the nickel interlayer originally inserted therein has disappeared and the joint has acquired a microstructure substantially equivalent to the surrounding parent alloy. The structure is substantially devoid of any detectable nickel interlayer. The photomicrograph shown in FIGURES 2(a) and 2(b) taken at 500 diameters, illustrates a joint between two components of the same nickel-chromium alloy as used in FIGURE 1 but wherein diffusion of the nickel has not been completed and some of the nickel interlayer can be easily distinguished.

The joint formed between the components, illustrated by the photomicrograph which is shown in FIGURE 1, was accomplished using a nickel interlayer having a thickness of 0.002 inch and using a pressure of 22,400 pounds per square inch prior to diffusion at 1100° C. for 8 hours. The joint had a tensile strength of about 40 tons per square inch. On the other hand, the joint illustrated by the photomicrograph in FIGURE 2 was accomplished using a nickel interlayer .005 inch thick and a pressure of 22,400 pounds per square inch prior to diffusion at 1100° C. for 4 hours. This joint had a tensile strength of approximately 20 tons per square inch.

Male components can be fitted into components having sockets or slots by a shrinkage technique, for example, in which the male components are placed in dry ice before assembly and subsequently allowed to warm up and expand after assembly with interposed nickel. This ensures that the surfaces are brought into intimate contact under pressure. In such a technique, pressures between the components of about 22,400 pounds per square inch are usually reached. In any case, the pressures applied to the components whether by shrinkage techniques or otherwise should be insufficient to cause substantial deformation of the components.

Figure 3:
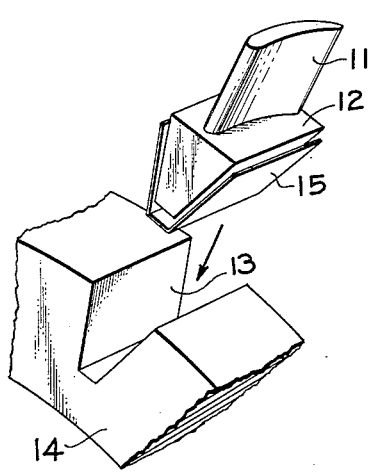
FIGURE 3 is a perspective view of a rotor blade and disc, the root of the blade being ready for insertion into the disc and attachment to it according to the present invention.
Figure 4:
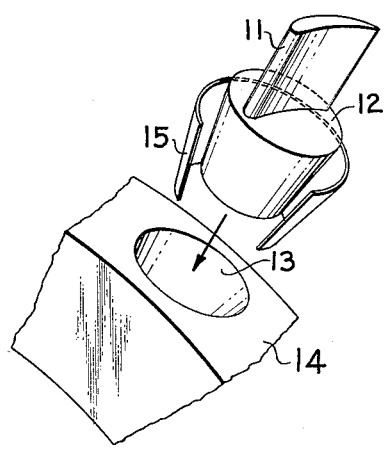
FIGURE 4 depicts a perspective view of a rotor blade and disc with an alternate type frusto-conical root and socket, respectively.
Figure 5:
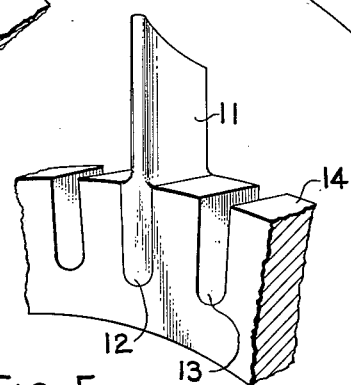
FIGURE 5 shows a perspective view of a blade root with parallel sides fitted into a rotor disc.
Figure 6:
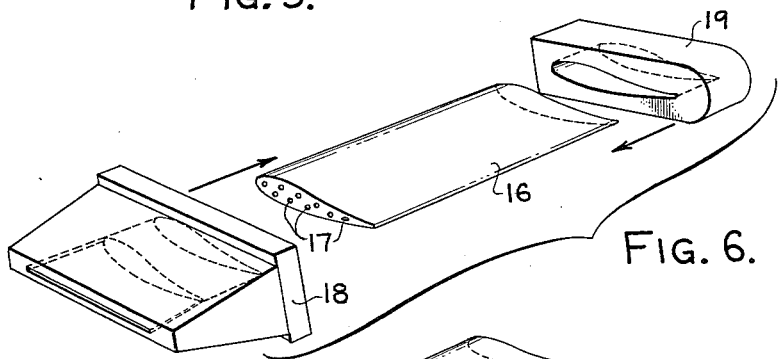
FIGURE 6 illustrates a perspective view of turbine blading ready for insertion into matching sockets in root and shroud pieces.

In the application of the invention to parts of gas turbines made of nickel-chromium and nickel-chromium-cobalt base alloys, blades with roots can be joined to a rotor by pressing each blade into or onto the rim of the rotor. Referring again to the drawings, this is illustrated in FIGURE 3, which shows a turbine rotor blade 11 having a root 12 of trapezoidal section ready for insertion into a matching slot 13 machined in the rim of a rotor disc 14. The surfaces of the root that abut on the walls of the slot can be covered with a thin sheet of nickel foil 15 or alternatively coated with a thin film of nickel. Alternatively, as shown in FIGURE 4, the sockets on the rotor rim can be frusto-conical and the blade roots of corresponding shape. FIGURE 5 shows a further construction in which the sides of the blade root are parallel and the root is fitted into a matching parallel-sided slot cut in the rotor rim by spark erosion. Again the end of a blade proper can be pressed into a socket in a blade root or into a shroud. FIGURE 6 shows a section of turbine blading 16 with longitudinal holes 17, formed by extruding a billet having longitudinal inserts of a filler material and subsequently removing the filler, ready for insertion into matching sockets in root and shroud pieces 18 and 19, respectively. The sockets can be cut by spark erosion and the end portion of the blade can be surrounded by foil or plated.

In all these embodiments diffusion welding under pressure according to the invention is carried out after assembly, and in those shown in FIGURES 5 and 6, a shrinkage-fitting technique can be used.

Figure 7:
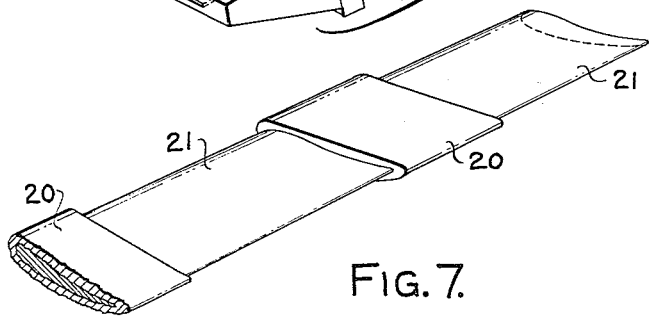
FIGURE 7 is a perspective view of blade roots slipped over a length of stock of blade section.

A further application of the invention is to the manufacture of small turbine blades with roots. In this process, which is illustrated in FIGURE 7, a number of sleeves 20 of appropriate section for the root of a blade are slipped over a length of stock 21 of blade section which may be provided with longitudinal cooling passages. The sleeves, which fit closely over the stock, are positioned suitable distances apart at points where the surface of the stock has previously been coated with nickel. After the root sleeves have been completely diffusion welded into position in accordance with the invention into a substantially homogeneous mass, e.g., under the pressure of a shrinkage fit, the assembly is cut adjacent to each of the roots into lengths each consisting of a blade part and a root. Of course, the interposed nickel layer could be provided in any other suitable manner.

The invention is not limited to joints made in components of nickel-chromium base alloys. It may also be applied to stainless steel, especially in the cutlery art where thin blades of stainless steel are to be joined to more substantial shank members.

Although the invention is particularly applicable to joints made in preformed components, it may be applied also to components which after being joined are subsequently extruded, forged or otherwise worked to produce the final article.

Two examples of such applications are illustrated by

Figure 8:
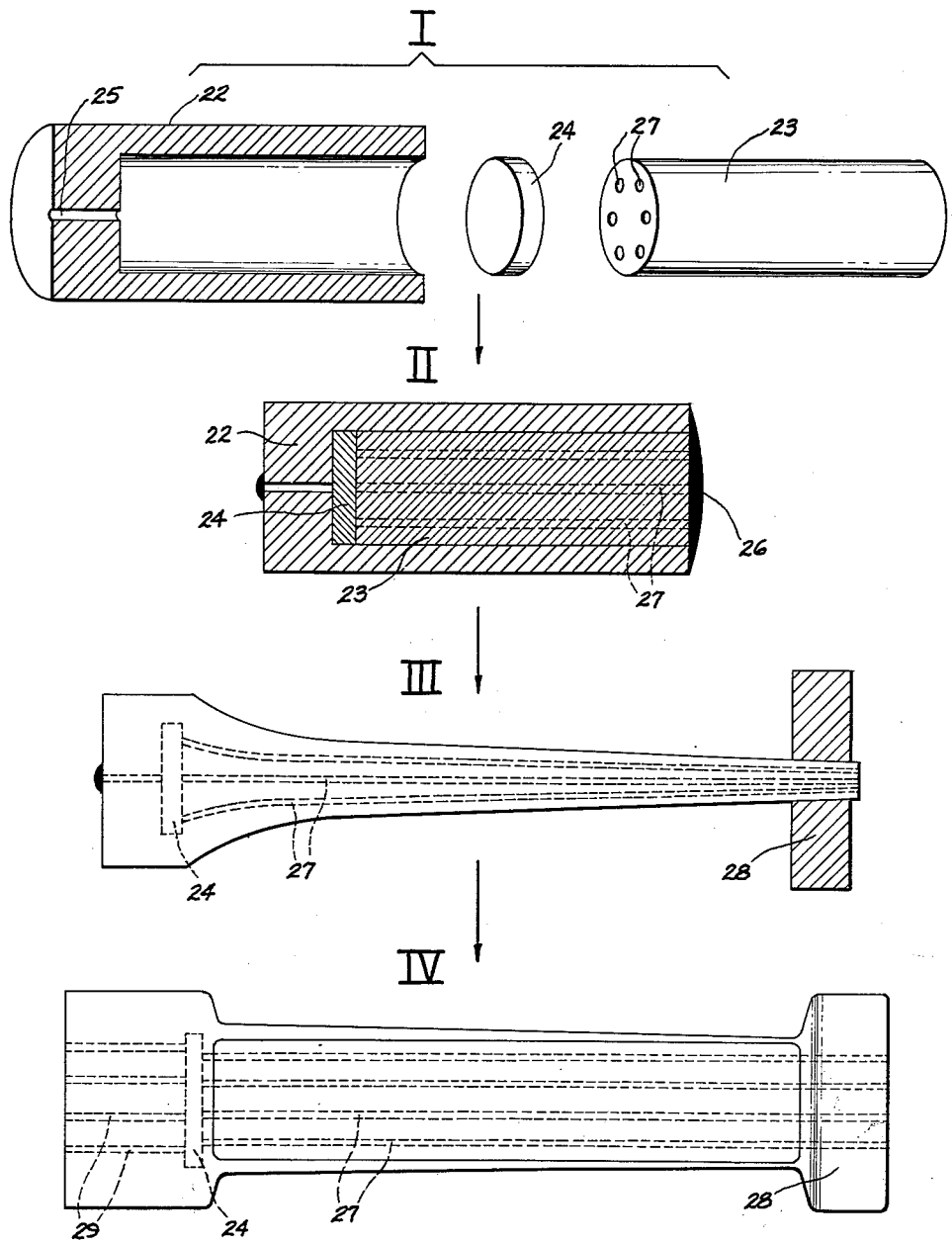
FIGURE 8 shows successive stages, indicated by numerals I to IV, in the formation of a turbine blade with cooling passages.
Figure 9:
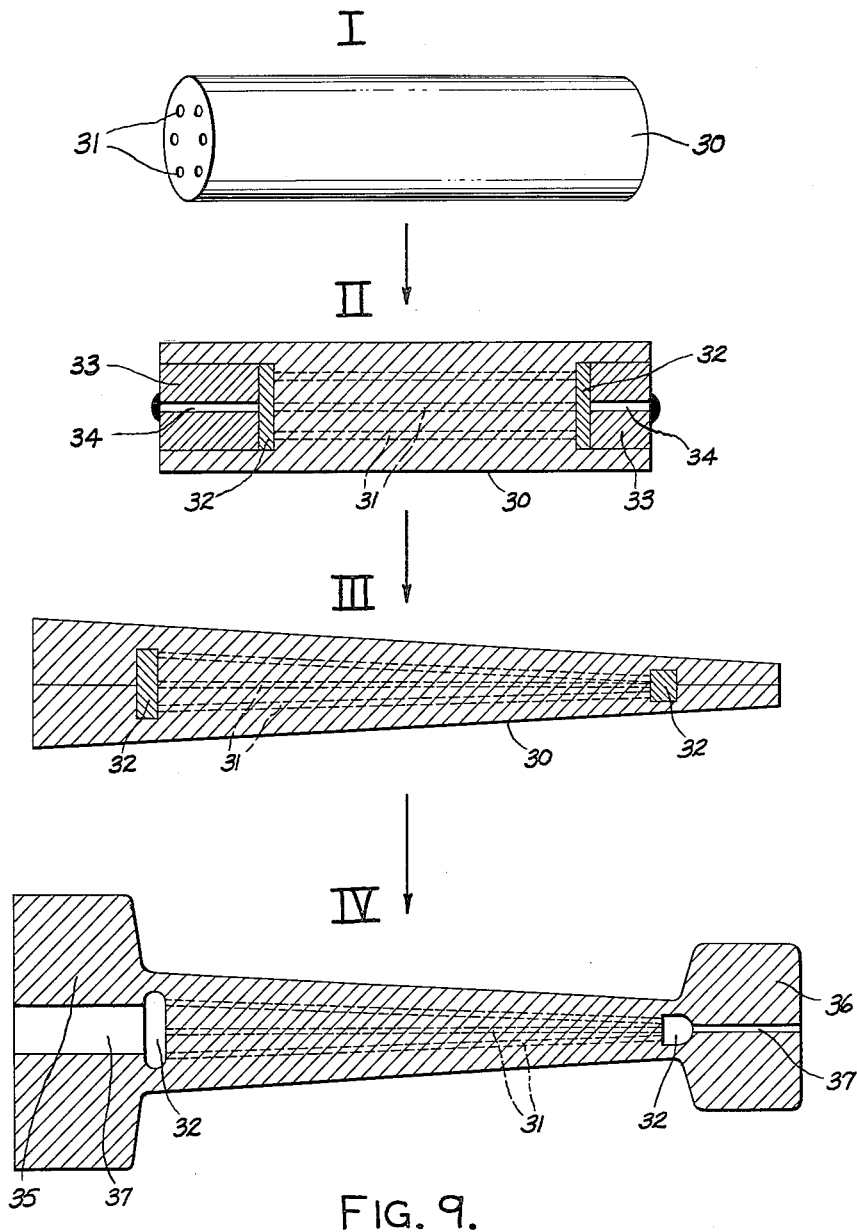
FIGURE 9 shows successive stages, also indicated by numerals I to IV, of a different technique for the formation of a turbine blade with cooling passages.

FIGURES 8 and 9, in which the numerals indicate successive stages in the operations.

One way in which a turbine blade with cooling passages can be made comprises making a composite billet which is subsequently extruded or forged. As shown in FIGURE 8, stages I and II, the manufacture of the billet comprises forming a cylindrical canister 22, preferably of a nickel-chromium creep-resisting alloy, and inserting in the cavity a rod 23 of the same alloy having longitudinal holes 27 filled with a filler material that flows with the alloy during the extrusion or forging and that can subsequently be removed by acid leaching. The rod 23 should form a shrinkage fit with the canister 22 and be coated on the outside with a nickel film. A plug 24 of the same filler material is put in the base of the cavity before the rod is inserted. The rod and canister are welded together by diffusion according to the invention. To allow air to escape during the assembly and heating, a vent hole 25 is provided in the closed end of the canister. This is then closed and a cap 26 is welded on to the open end of the canister to prevent escape of filler material, and the assembly extruded or taper-forged to form a blade blank with root as shown in stage III. The narrow end of the blade can then be fitted into a shroud 28 and joined to it by diffusion welding according to the invention, and the blade further forged to shape as in stage IV. Holes 29 may then be drilled in the root to meet the mass of filler material that originally formed the disc 24, and the filler material finally leached out to form a blade with longitudinal cooling passages. The use of the plug 24 of filler material results in the formation of a chamber in the root of the blade, with the advantages both that the difficulty of drilling holes accurately through the blade root to meet the passages 27 is obviated and that a distributing chamber is provided for the cooling air within the blade itself.

In the process illustrated in FIGURE 9, an extruded bar 30 of heat-resisting alloy, shown in stage I, having longitudinal holes 31 filled with a material that flows with the alloy during hot working is in stage II hollowed out at both ends and into each end there is inserted a plug 32 of the filler material and a plug 33 of the same alloy as the bar, previously coated on the outside with a film of nickel and of such a size as to make a shrinkage fit into the holes. The alloy plugs 33 are provided with vents 34 to allow air to escape during assembly.

The plugs 33 are then joined to the bar by diffusion welding according to the invention to provide a homogeneous mass, the vent holes closed and the assembly taper swaged as shown at stage III. In stage IV, the ends are then upset to form a root 35 and a shroud 36, the workpiece is forged to shape, and finally holes 37 are drilled at each end to meet the mass of filler material formed by the discs 32 and the filler is leached out.

Filler materials used for providing filled holes in the aforementioned fabrication of turbine blades with cooling passages are most advantageously ferritic manganese-titanium steels containing about 5% to about 20% manganese, about 1% to about 10% titanium and up to about 0.3% carbon, with the balance essentially iron. These steel filler materials are described and claimed in the Betteridge U.S. application Serial No. 509,380. Other advantageous filler materials are metal-ceramic mixtures having a continuous metal phase and containing about 5% to about 25% ceramic material, e.g., magnesia, and the balance metal, e.g., iron. Such metal-ceramic fillers are described and claimed in the Hignett U.S. application Serial No. 472,755.

When the term nickel is used in the present specification and claims with regard to the interlayer between chromium-containing components, it is to be observed that this term includes pure nickel, commercially pure nickel and alloys rich in nickel, that is, alloys containing at least about 99.00% nickel and small amounts of one or more elements such as titanium, magnesium, calcium, zirconium and iron.

It is to be observed that the present invention provides a method of forming a unitary metal article in which two or more metallic components are integrally united by diffusion with a resulting joint which has a composition substantially the same as the metallic components and which is substantially devoid of detectable nickel interlayers, the nickel interlayer being substantially eliminated by diffusion into and between the metallic components. The components which consist of chromium-containing alloys have a metallic nickel layer interposed throughout their interfaces prior to the diffusion welding. This nickel layer may be nickel powder, nickel foil or a sprayed or plated nickel coating on one or both of the mating interfaces and has a thickness of about 0.0005 inch to about 0.005 inch. The components are pressed together at about 10,000 pounds per square inch to about 27,000 pounds per square inch (12 tons per square inch) while heated to between about 1000° C. to about 1100° C. for sufficient time to completely diffuse the nickel interlayer, usually for about eight to about fifteen hours, to form the novel improved articles.

Furthermore, the metallic components may consist of turbine parts which are joined to form turbine assemblies. Turbine blade roots and rotor discs can be united according to the invention or the components can be a stock turbine blade section and turbine root sleeves with the latter being integrally united to the former and the complete assembly being cut up into complete blade and root units.

Moreover, the invention provides a method of forming a turbine blade with cooling passages in which an alloy rod coated on the outside with a nickel film and containing longitudinal holes filled with filler material is preceded by a plug of filler material, inserted into a canister of the same alloy and is united to the canister according to the invention. By forging and extrusion means a blade blank with a root is formed and at least one hole is drilled in the root to meet the filler material which is then leached out.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method of forming a unitary metal article which comprises providing at least two chromium-containing metallic components of substantially the same composition made of an alloy selected from the group consisting of nickel-chromium alloys and cobalt-chromium alloys containing at least 25% of chromium plus metal from the group consisting of nickel and cobalt with the balance being essentially iron and having mating faces, interposing between said faces of said metallic components a layer of metallic nickel having a thickness of about 0.0005 inch to about 0.005 inch, and pressing said components together at said faces with a pressure of about 10,000 pounds per square inch to about 20 tons per square inch and insufficient to substantially deform said components, while heating the assembly so formed at between about 1000° C. and about 1100° C. for about eight hours to about fifteen hours to substantially eliminate said nickel layer by diffusion into and between said components and provide a substantially homogeneous article having a composition throughout the body of said article uniformly resistant to the adverse effects of oxidation at high and low temperatures.

2. A method of producing turbine blades integral with a rotor disc which comprises providing turbine blades with roots and a rotor disc, each made of an alloy selected from the group consisting of nickel-chromium alloys and cobalt-chromium alloys containing at least 25% of chromium plus metal from the group consisting of nickel and cobalt with the balance being essentially iron, having substantially similar compositions and said turbine blade roots being matable with said rotor disc, interposing between each mating turbine blade roots and said rotor disc a layer of nickel having a thickness of between about 0.0005 inch to about 0.005 inch, and pressing said turbine blade roots and said rotor disc in mating relationship at a pressure of at least 10,000 pounds per square inch and insufficient to substantially deform the blades and disc for at least about eight hours under a non-oxidizing atmosphere, while maintaining the temperature of said parts at about 1000° C. to about 1100° C., to substantially eliminate said nickel layer by diffusion into and between said components and provide a unitary turbine blade rotor disc assembly having a composition throughout said assembly uniformly resistant to the adverse effects of oxidation at high and low temperatures.

3. A method of producing a turbine blade having integral end structures which comprises providing a turbine blade structure and at least one blade end structure matable with said blade structure, each made of an alloy selected from the group consisting of nickel-chromium alloys and cobalt-chromium alloys containing at least 25% of chromium plus metal from the group consisting of nickel and cobalt with the balance being essentially iron, having substantially the same composition, interposing between the mating surfaces of said blade structures a layer of nickel having a thickness of between about 0.0005 inch to about 0.005 inch, pressing said turbine blade structures in mating relationship at a pressure of at least about 10,000 pounds per square inch and insufficient to substantially deform said parts for at least about eight hours under a non-oxidizing atmosphere, while maintaining the temperature of said parts at about 1000° C. to about 1100° C., to substantially eliminate said nickel layer by diffusion into and between said structures and provide a unitary substantially homogeneous turbine blade having a composition throughout said blade uniformly resistant to the adverse effects of oxidation at high and low temperatures.

4. A method of producing a hollow turbine blade blank which comprises providing a plurality of matable parts having a plurality of filled longitudinal holes in at least one of said parts and made of an alloy selected from the group consisting of nickel-chromium alloys and cobalt-chromium alloys containing at least 25% of chromium plus metal from the group consisting of nickel and cobalt with the balance being essentially iron, interposing between the mating surfaces of said parts a layer of metallic nickel between about 0.0005 inch to about 0.005 inch thick, assembling said parts in mating relationship with said nickel layer therebetween, causing said parts to press together at a pressure of at least about 10,000 pounds per square inch for at least about eight hours while maintaining the temperature of said parts at about 1000° C. to about 1100° C. to provide a substantially homogeneous unitary assembly and to substantially eliminate said nickel layer by diffusion into and between said components, working said assembly to form a turbine blade blank and, thereafter, removing the filler from said blank to provide a hollow turbine blade having a composition throughout said blade uniformly resistant to the adverse effects of oxidation at high and low temperatures.

References Cited in the file of this patent

UNITED STATES PATENTS

| | | |
|---|---|---|
| 2,166,998 | Morgan | July 25, 1939 |
| 2,332,330 | McMahan | Oct. 19, 1943 |
| 2,751,808 | MacDonald et al. | June 26, 1956 |
| 2,809,422 | Schultz | Oct. 15, 1957 |
| 2,834,102 | Pflumm et al. | May 13, 1958 |
| 2,837,818 | Storchheim | June 10, 1958 |
| 2,870,241 | Mason | Jan. 20, 1959 |

FOREIGN PATENTS

| | | |
|---|---|---|
| 520,365 | Great Britain | Apr. 22, 1940 |
| 755,610 | Great Britain | Aug. 22, 1956 |